Nov. 10, 1953  B. BANNISTER  2,658,257
PIPE COOLING ARRANGEMENT FOR HIGH-SPEED CONTINUOUS MILLS
Filed Jan. 29, 1951
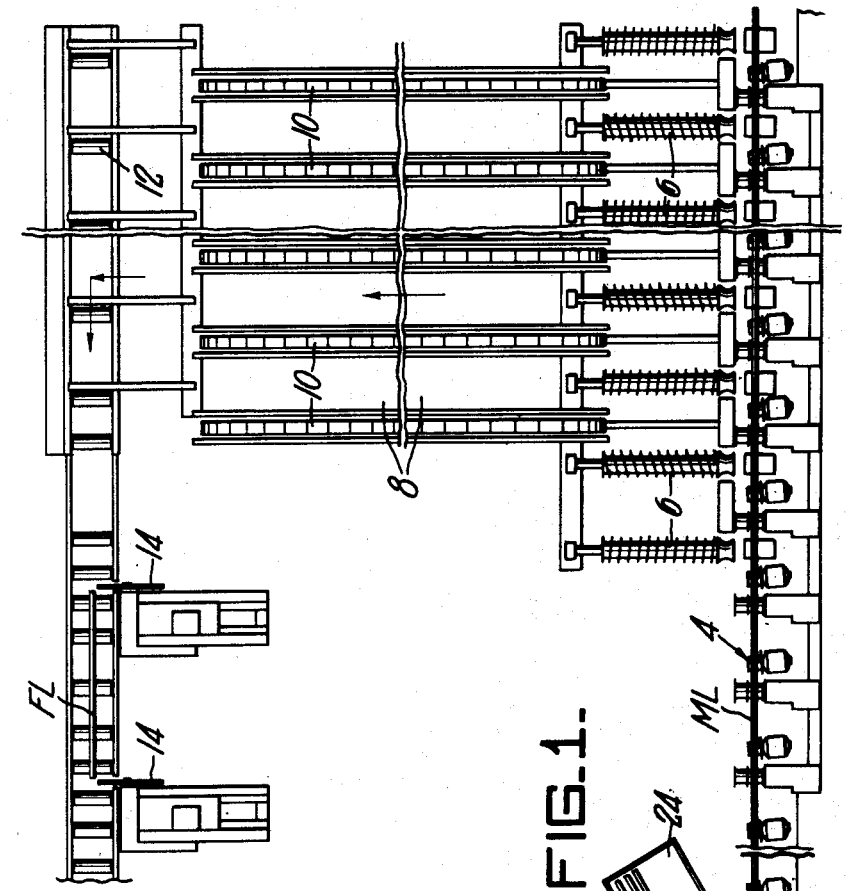
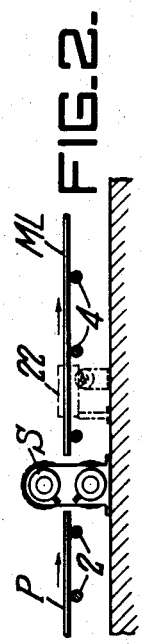
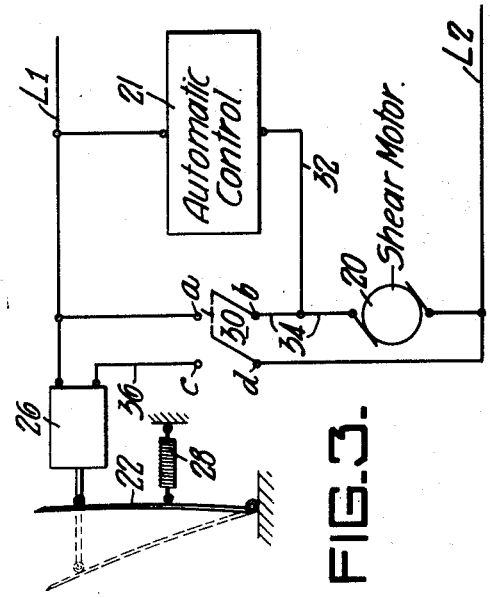
Inventor:
BRYANT BANNISTER,
by: Donald G. Dalton
his Attorney.

Patented Nov. 10, 1953

2,658,257

UNITED STATES PATENT OFFICE 2,658,257

PIPE COOLING ARRANGEMENT FOR HIGH-SPEED CONTINUOUS MILLS

Bryant Bannister, Pittsburgh, Pa., assignor to United States Steel Corporation, a corporation of New Jersey Application January 29, 1951, Serial No. 208,419

2 Claims. (Cl. 29—70)

This invention relates to high speed continuous pipe mills and more particularly to an improved arrangement for cooling and cutting the pipe to length.

In modern continuous pipe mills wherein the speed of delivery of pipe from the welding and sizing mill has reached speeds in excess of 2000 feet per minute, the problem of cooling and cutting the sized pipe to length becomes acute. Heretofore, the pipe has been cut to salable lengths as it emerges from the sizing mill. This, however, is physically impossible at the present day delivery speeds. Accordingly, it is proposed to first cut the pipe by a flying shear to multiples of the desired finished lengths, cool the pipe on an elongated cooling table and then cut the multiples to the desired length by conventional saws or the like. In such an arrangement any holdup on the conveyor or delivery table, the oncoming pipe will become entangled with the pipe which has preceded it. To remedy this trouble, it is further proposed to provide means for shearing the pipe into short lengths and deflect same from the cooling table conveyor until the mill can be slowed down.

It is accordingly an object of this invention to overcome the foregoing difficulties and provide a method and apparatus for cooling and cutting pipe suitable for high speed continuous pipe mills.

The foregoing and further objects will be apparent from the following specification when read in conjunction with the attached drawing, wherein:

Figure 1 is a plan;
Figure 2 is a side elevation; and
Figure 3 is a wiring diagram.

Referring more particularly to the drawing, the numeral 2 designates a conveyor for delivering pipe in continuous lengths from a high speed mill (not shown). Pipe P on the delivery conveyor 2 passes through a rotary shear S which normally cuts it into lengths which are multiples of the finished lengths desired and these multiple lengths ML are then transferred by conveyor 4 and screws 6 to a cooling table 8. The cooling table comprises a plurality of endless chains 10 for moving the multiple lengths onto a conveyor 12 which moves the multiple lengths to a plurality of suitable saws 14 where they are cut to the desired finished lengths FL.

In regular operation, the shear is intermittently rotated one revolution by the shear motor 20 actuated by an automatic control 21. However, if there is a holdup on the conveyor 4 or cooling table 8, I have provided a separate control for the motor 20 so that it may be operated continuously to cut the pipe into short scrap lengths which are deflected from the conveyor 4 by a solenoid operated deflector gate 22 into a bucket 24.

As shown in the diagram of Figure 3, the foregoing members receive their power from main lines L1 and L2. Line L1 is connected directly to the solenoid 26 of the deflector, the automatic control 21 and contact $a$ of a double pole knife switch 30. Line L2 is connected directly to the motor 20 and to contact $d$ of the knife switch 30. The control 21 is connected to the motor by lines 32 and 34, the latter of which is connected to contact $b$ of the knife switch. The solenoid 26 is connected to contact $c$ of the knife switch by a line 36.

From the foregoing, it is seen that in normal operation, the motor 20 is actuated at timed intervals by automatic control 21 to rotate the shear S through one revolution. However, in case of trouble in the conveyor or cooling table beyond the shear, the mill operator can operate the switch 30 to close contacts $a, b$ and $c, d$ whereby the controller 21 is by-passed and the motor 20 continuously energized whereby the pipe is cut into short lengths. At the same time, the solenoid 26 is energized due to closing the contacts $c, d$ so that the deflector 22 is moved into the pass line of the cut lengths to deflect them onto the bucket 24. Upon opening of the contacts $a, b$ and $c, d$, the motor is again controlled by the controller 21, the solenoid 26 is deenergized permitting the deflector gate to be returned to normal position by spring 28.

By way of example, a delivery speed of the pipe P of 2550 feet per minute is assumed and it is cut in multiple lengths of 220 feet with a shear blade having a radius of 12" and having a peripheral travel of 6.28' per revolution. With a peripheral speed of travel of the shear blade while running continuously of 2600 feet per minute, the time to make one revolution thereof would be $$\frac{6.28'}{2600'}$$

or .00241 minute which would result in sheared pieces of pipe being 2550×.00241 or 6.15 feet. Such lengths can of course be expeditiously handled in the manner described.

While I have shown and described one specific embodiment of my invention, it will be understood that this embodiment is merely for the purpose of illustration and description and that various other forms may be devised within the scope of my invention, as defined in the appended claims.

I claim:

1. Apparatus of the class described comprising a high speed conveyor for long lengths of pipe, a rotary shear disposed in said conveyor, an automatic controller for said shear adapted to intermittently actuate said shear to cut rapidly moving pipe on said conveyor into multiple lengths, a cooling bed adapted to receive said multiple lengths from said high speed conveyor, and slow speed conveyor means at the outlet side of said cooling bed adapted to receive said multiple lengths, a plurality of saws disposed adjacent said slow speed outlet conveyor, said saws being adapted to cut said multiple lengths into finished lengths and to remove the damaged ends on said multiple lengths resulting from cutting said pipe with said rotary shear.

2. Apparatus of the class described comprising a high speed delivery conveyor for long lengths of pipe, a rotary shear disposed in said conveyor, an automatic controller for said shear adapted to intermittently actuate said shear to cut rapidly moving pipe on said conveyor into multiple lengths, a cooling bed adapted to receive said multiple lengths from said high speed conveyor, a deflector gate in said last high speed conveyor intermediate said shear and said cooling bed, and a separate manual control adapted to by-pass said automatic controller and operate said shear continuously to cut pipe on said delivery conveyor into short lengths and to simultaneously operate said deflector gate to deflect said short lengths from said delivery conveyor.

BRYANT BANNISTER.

References Cited in the file of this patent

UNITED STATES PATENTS

| Number | Name | Date |
| --- | --- | --- |
| 908,761 | Duncan | Jan. 5, 1909 |
| 1,790,601 | Sieffert | Jan. 27, 1931 |
| 2,032,738 | Cramer et al. | Mar. 3, 1936 |
| 2,085,981 | Iversen | July 6, 1937 |
| 2,294,658 | Hazeltine | Sept. 1, 1942 |